UNITED STATES PATENT OFFICE.

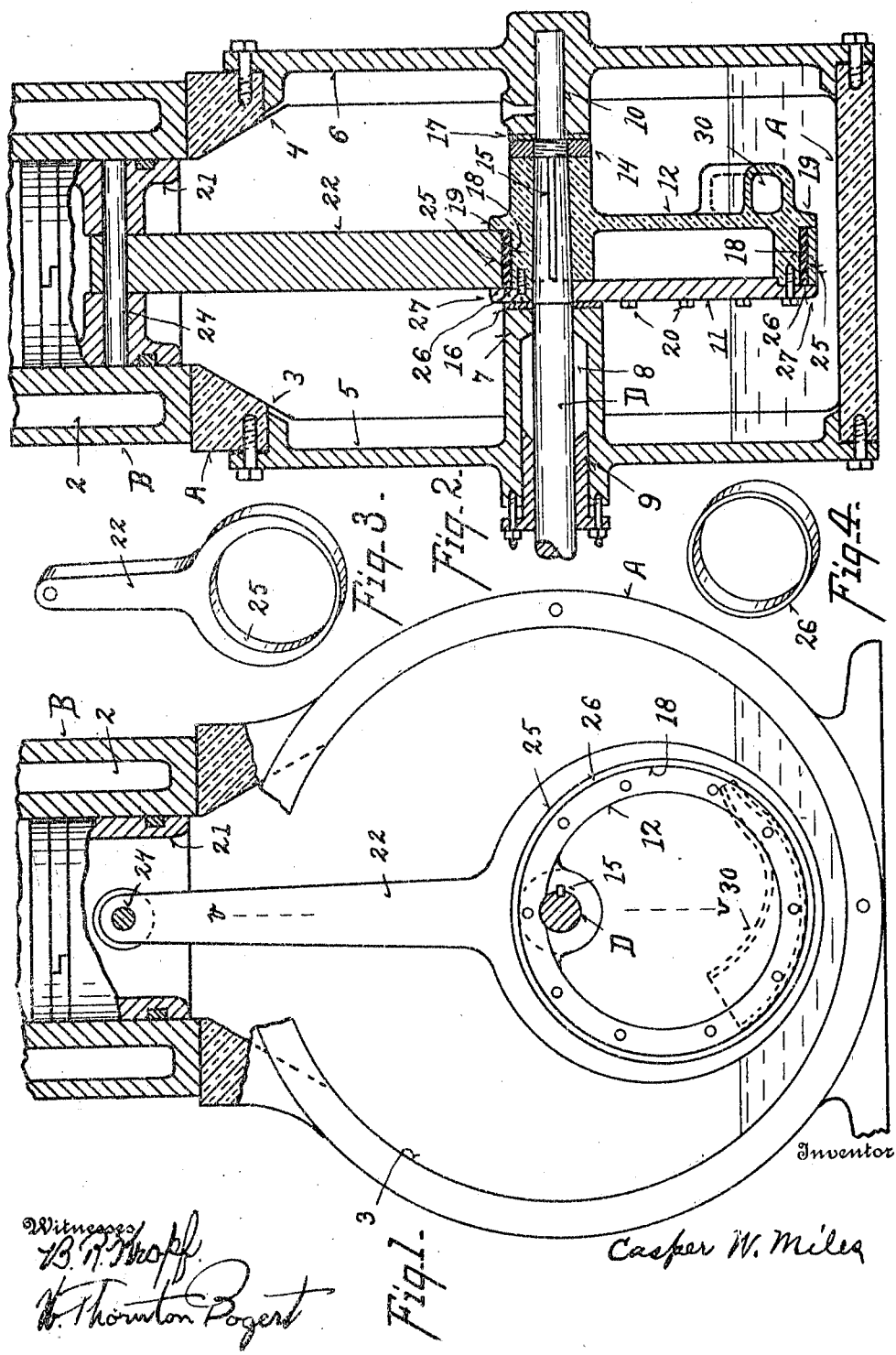

CASPER W. MILES, OF ANDERSON TOWNSHIP, HAMILTON COUNTY, OHIO, ASSIGNOR TO STEPHEN S. MILES, OF GREENSBORO, NORTH CAROLINA.

GAS-COMPRESSOR-DRIVING MECHANISM.

1,096,790.   Specification of Letters Patent.   Patented May 12, 1914.

Application filed July 23, 1913. Serial No. 780,701.

*To all whom it may concern:*

Be it known that I, CASPER W. MILES, a citizen of the United States, residing in Anderson township, in the county of Hamilton and State of Ohio, have invented certain new and useful Improvements in Gas-Compressor-Driving Mechanism, of which the following is a specification.

My invention relates to improvements in the driving connections between the shaft and plunger of air or gas compressors and similar structures.

One of its objects is to provide improved mechanism to transmit motion from the driving shaft to the plunger, and which provides wearing surfaces of large area and which can be relied upon when not readily accessible to perform their functions for long periods without attention.

Another object is to provide for restoring the connecting mechanism to working condition by the substitution of a new part in place of a worn or defective one, and which is readily detachable for that purpose.

Another object is to provide straight driving shafts with reliable and efficient means to take the place or act as a substitute for crank shafts heretofore extensively employed.

My invention also comprises certain details of form, combination and arrangement, all of which will be fully set forth in the description of the accompanying drawings in which:

Figure 1 is a side elevation, partly in section of a gas compressor with one of the casing heads, and one of the eccentric plates removed, and embodying my invention. Fig. 2 is a central vertical section on line *v v* of Fig. 1. Fig. 3 is a perspective view of the pitman detached. Fig. 4 is a perspective view of a detachable bearing band or ring.

The accompanying drawings represent the preferred embodiment of my invention in which—

A represents the base or frame of a gas compressor, and B represents the cylinder preferably provided with a water jacket 2. The casing A is provided with openings 3 and 4 at opposite sides, which openings are fitted with detachable caps 5 and 6. The cap 5 is provided with a bearing for the driving shaft D and a stuffing box 8 and gland 9 to prevent leakage around the shaft to or from the casing. The cap 6 is provided with a blind bearing 10 to receive the opposite end of the shaft. A pulley, not shown outside the cap 5, is preferably employed to drive the shaft D.

Mounted upon the shaft D between the bearings 7 and 10 is an eccentric in two parts 11 and 12. The shaft is preferably tapered and drawn into a tapered bore in the eccentric by means of a nut 14 threaded upon the shaft. I also preferably provide a key 15 to lock the eccentric to the tapered portion of the shaft. Other means may be employed if desired to firmly lock the eccentric to the shaft. One or more spacing collars 16 and 17 are employed to centrally locate the eccentric with reference to the casing and cylinder, and to prevent end play of the shaft. The eccentric member 12 has a peripheral bearing face 18 eccentric to the shaft axis and a flange 19 at one side of said bearing face. The eccentric member or plate 11 has a flange 27 at the opposite side of the bearing face 18, and is detachably connected to the member 12 by means of bolts or screws 20.

The pitman or connecting rod 22 is pivotally connected to the plunger 21 by means of a pin 24, and at its opposite end has a large bore 25 which is of somewhat greater diameter than that of the bearing face 18. A detachable ring or band 26 is interposed between the faces of the bore 25 and the bearing face 18 so as to closely fit both faces and so that sliding movement may take place either between the band and the pitman or between the band and the eccentric. When the band and pitman are in place upon the eccentric as illustrated in Fig. 2, the flanges 19 and 27 serve to hold both the band and pitman in place with reference to the eccentric. The band 26 may be of hardened steel, or of other material depending upon the service required, and is preferably ground to accurately fit the exterior of the eccentric and the bore of the pitman. The band presents two wearing surfaces of exceedingly large area, and may be extensively used for long periods without wearing sufficiently to cause lost motion and consequent knocking or pounding. A straight shaft may be employed which is not liable to twist or break under heavy strain, and when worn or defective the band may be readily detached and a new one substituted.

In practice the gas may be taken into the casing A and thence passed through a valve in the plunger and compressed in the cylinder, as disclosed for instance in my former Patent No. 878,483, dated Feb. 4, 1908. A quantity of lubricating oil is located in the lower portion of the casing into which the eccentric, the band 26, and the lower portion of the pitman dip to keep said parts and also the shaft bearings lubricated. I also preferably provide a curved channel or converging tube 30 carried by the eccentric which dips, large end first, into the lubricant as the eccentric rotates so as to cause a fine jet or spray to issue from the smaller end of said tube and directed toward the plunger and cylinder walls, which serves to keep the cylinder walls and upper end of the pitman lubricated. If desired the band 26 may be tightly fitted to or locked to either the pitman or the eccentric, so as to have only one sliding or wearing surface.

The mechanism herein illustrated is capable of considerable modification without departing from the principle of my invention.

Having described my invention, what I claim is:

1. In an apparatus of the class set forth, a cylinder, a casing affixed to the open end thereof, said casing being provided with detachable heads at opposite sides thereof, said heads being provided with inwardly extended bearings and one of said bearings provided with a stuffing box, a straight shaft extending through said stuffing box and supported in said respective bearings, a divided eccentric affixed to the shaft and in bearing engagement at opposite sides with the inner ends of the respective bearings, a pitman having a strap at one end in engagement with the eccentric and a piston connected to the other end of said pitman, to enable said shaft and eccentric to be detached from the pitman and removed through the openings in said casing.

2. In an apparatus of the class set forth, a cylinder, a casing affixed to the open end thereof, said casing being provided with detachable heads at opposite sides thereof, one of these heads being provided with an inwardly extending blind bearing and the other head being provided with an inwardly extending stuffing box, a straight shaft extending through the stuffing box and having its inner ends inserted in said blind bearing, an eccentric device affixed to the shaft and having its opposite sides in bearing engagement with the inner ends of the respective bearings, a pitman having a strap at one end in engagement with the eccentric and a piston connected to the other end of the pitman, said eccentric device embodying a hub member engaging the shaft, a side member formed integral with the hub member, a removable side member, and a removable anti-friction band held by said side members removably in place between the eccentric and the pitman strap.

In testimony whereof I have affixed my signature in presence of two witnesses.

CASPER W. MILES.

Witnesses:
B. R. KROPF,
W. THORNTON BOGERT.